March 14, 1950     D. H. SIELING     2,500,878
CATAPHORETIC APPARATUS
Filed Nov. 3, 1947
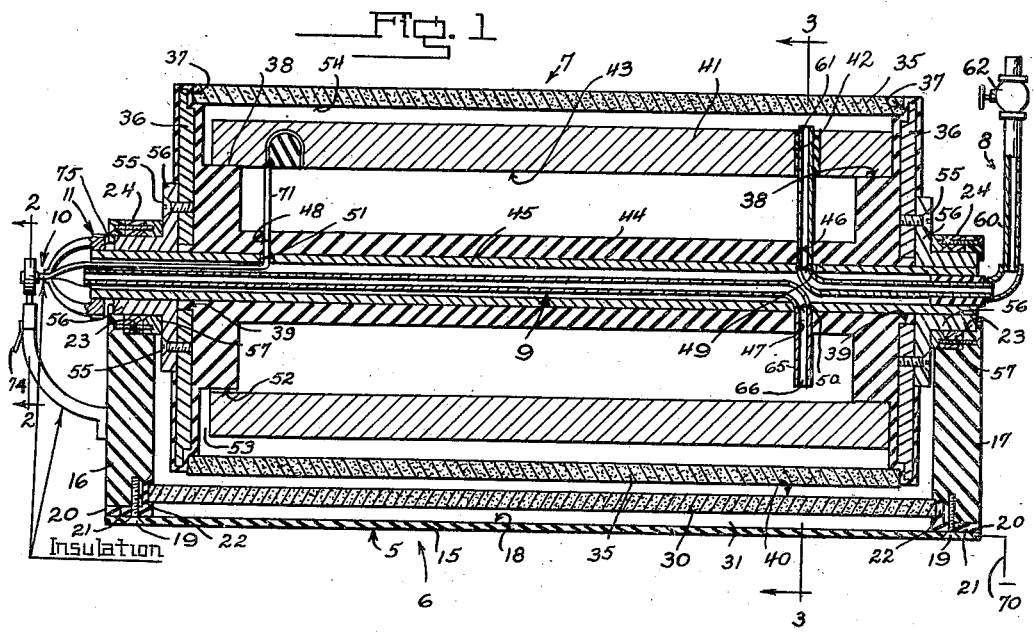
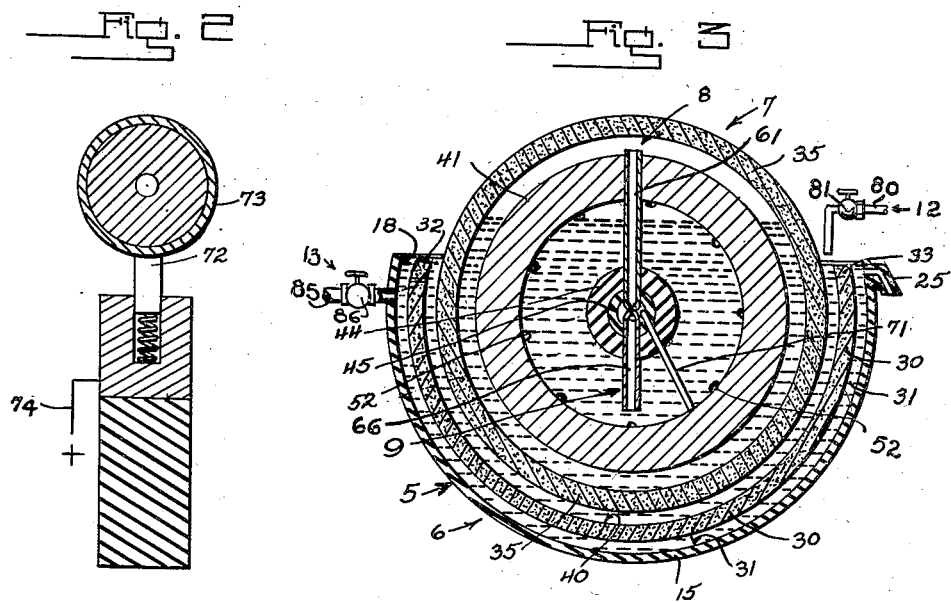
INVENTOR.
Dale H. Sieling
BY *Lancaster, Allwine & Rommel*
ATTORNEYS.

Patented Mar. 14, 1950

2,500,878

UNITED STATES PATENT OFFICE 2,500,878

CATAPHORETIC APPARATUS

Dale H. Sieling, Amherst, Mass.

Application November 3, 1947, Serial No. 783,798

5 Claims. (Cl. 204—300)

This invention relates to the production of substantially pure colloidal clay salts and clay acids by a combination of electrodialysis, cataphoresis and electrolysis.

Colloidal clays, principally of the montmorillonite type such as bentonite, are widely used as adsorbents, catalysts, emulsifying agents, ceramic clays and glazes, lubricants, drilling muds, bonding materials for moulding sands, weighing materials for textiles, glazes and loaders for paper and, in addition, they are used as surface active agents and extenders in insecticides, fungicides, germicides, cosmetics, and pharmaceuticals.

These colloidal clays generally occur in geological deposits, as mixtures of the active colloidal alumino-silicates and inert non-colloidal foreign substances. The colloidal clays usually contain a mixture of adsorbed cations, such as sodium, calcium, magnesium, and potassium, and variable quantities of molecularly adsorbed salts. Most of the important physico-chemical properties of those clays are directly related to the kind and quantities of the adsorbed cations.

For most of the purposes mentioned above, the active colloidal clay must be separated from the relatively coarse mineral impurities and be converted into a colloidal clay system containing only one kind of adsorbed cation. The separation of the colloidal clay from the gross impurities can be achieved by introducing the clay to a large volume of water in which the colloidal clay will remain suspended and the gross materials will settle out. The suspended colloidal clay, with its mixture of adsorbed cations and molecular impurities, must be separated from the water and converted to a clay containing only one kind of adsorbed cation. The method now employed industrially for the production of these so-called pure clays, containing only one kind of adsorbed cation, depends upon the separation of the suspended colloidal clay from the water by ultra-filtration or ultra-centrifugation either before or after the desired mono-cationic clay has been formed by a cation-exchange reaction. This method of production of these clay salts or acid is theoretically a very simple process but, in practice, it is one of the most difficult of chemical engineering procedures and, at best, produces very impure materials.

An important object of the invention is to provide a single apparatus and treatment for effectively and completely removing adsorbed cations and molecular impurities from suspended colloidal clay by electrodialysis, to produce a colloidal clay acid, concentrating and precipitating the colloidal clay acid by cataphoresis, and converting the precipitated clay acid into pure metallic salt or acid metallic salt of the clay by electrolysis.

Another important object is to provide an apparatus which may be employed to provide colloidal acid clay by introducing the first two electrochemical steps mentioned above and omitting the third, or electrolytic step, since the apparatus is adapted for such flexible employment.

Still another major object is to provide an apparatus which is simple in operation, employing no complicated mechanical parts, is efficient, so that the specificity of the product obtained is assured, and there is no need for subsequent treatment to remove impurities, such as produced by cation-exchange reactions.

A further important object is to provide an apparatus which will substantially eliminate the usual difficultly-operable and unpredictable cation-exchange reactions encountered in the conventional methods of producing colloidal clay acid or salt from impure clays.

Another important object is to provide novel methods for the production of substantially pure colloidal clay acids and salts.

Other objects and advantages of the invention will be apparent during the course of the following detailed description of the invention, taken in connection with the accompanying drawing, forming a part of this disclosure, and in which drawings Figure 1 is a vertical, longitudinal section of the novel apparatus.

Figure 2 is a fragmentary transverse section, substantially upon the line 2—2 of Figure 1.

Figure 3 is a transverse section of the apparatus of Figure 1 substantially upon the line 3—3 of that figure.

In the drawing wherein for the purpose of illustration is shown a preferred embodiment of the invention and wherein similar reference characters designate corresponding parts throughout the several views, the novel apparatus is shown to include a container or tank 5, in which is a cathodic structure 6 and an anodic structure 7, defining anodic and cathodic as well as other chambers, while there is also provided means 8 to convey a liquid, as water to the anodic chamber, means 9 to discharge solution and gases from another chamber, means 10 to conduct electricity to and from the apparatus, means 11 to cooperate in rotation of the rotor portions of the apparatus, means 12 to convey the clay suspension to the tank 5 for treatment, and a second liquid supply means 13.

The stationary container or cathode tank 5 may have an arcuate side wall 15, and end walls 16 and 17, all defining an upwardly-opening compartment 18 with the wall 15 forming the cathode of the apparatus. The side wall is of suitable metal, preferably having a smooth inner surface and may be secured to the end walls 16 and 17 by any approved means, as the screws 19. To provide a liquid-tight seal between the wall 15 and walls 16 and 17 a gasket 20 may be provided. Preferably, this is of special construction, having a portion 21 disposed between the wall 15 and walls 16 and 17, as the case may be, and a portion 22 normal to the portion 21, fitting into a recess provided in the inner (confronting) faces of each of the end walls 16 and 17. Thus each gasket is L-shaped in transverse cross-section. In addition to the recesses, each end wall may be provided with a shaft-and-bearing opening 23 with their axes in alignment. Preferably adjacent one upper end 24 of the side wall 15 intermediate its length may be an overflow opening or outlet 25 to the exterior of the tank 5.

Carried by the stationary cathode tank walls 16 and 17, and within the compartment 18, is a cathodic diaphragm 30. This may be an arcuate sheet of porous ceramic material or rigid, tightly-woven, alkali-resistant fabric. It is supported, at its ends by the gasket portions 22, as shown in Figure 1, and, of course, spaced from the side wall 15. With the adjacent portions 22 of gaskets 20 and the side wall 15, the diaphragm 30 defines a cathodic chamber 31 which is open at its upper ends, as is clear in Figure 3. One side edge portion 32 of the diaphragm 30 is lower than the opposite higher side edge portion 33 (for reasons later detailed), whereby the edge of the portion 32 is somewhat below the horizontal plane of the upper edges of the wall 15, but the edge of the portion 33 is in substantially the same horizontal plane of the upper edges of the wall 15.

Rotatably carried by the tank 5 is the rotor portion of the novel apparatus. This includes an anodic diaphragm 35 which is preferably cylindrical and of a suitable porous ceramic material adapted to permit the diffusion of water and anions therethrough but will retain, on its outer surface, cataphoretically-deposited clay. The ends of the cylindrical diaphragm 35 are closed by end walls 36. These walls may be of any suitable rigid material, as metals faced by dielectric material, as rubber, and have peripheral flanges providing shoulders 37 to receive the end portions of the cylindrical diaphragm 35, and cylindrical bosses extending toward each other from their inner faces, providing shoulders 38 to support the anode to be described. They are also provided with axially-disposed openings 39 for a portion of the structure to be subsequently described. The space between the spaced-apart diaphragms 30 and 35 and end walls 16, 17 and 36 define an electrodialysis chamber 40.

Within the cylindrical diaphragm 35, and spaced therefrom, is an anode 41 This is preferably either an inert material (graphite, platinum, or other suitable material) or active material (as copper) cylinder, mounted concentrically with the diaphragm 35, upon the shoulders 38. Extending through the wall of the anode 41 is an opening 42 for a conduit to be described. Extending across the chamber 43 within the cylindrical anode 41 and from one boss to the other is a sleeve 44 surrounding a hollow shaft 45.

The sleeve is provided with two conduit-receiving openings 46 and 47, intermediate its length and an electric conductor-receiving opening 48, and the shaft 45 is provided with like openings 49, 50 and 51. One of the cylindrical bosses providing the shoulders 38 has a plurality of axially-extending peripheral grooves 52 and the edge of the anode 41 does not abut the facing of the adjacent end wall 36, so that there are fluid passageways, along these grooves 52 and the space 53 between the anode and end wall 36 to the anodic chamber 54, within the cylindrical anodic diaphragm 35.

Projecting outwardly from and attached to the end walls 36, as by the screw means 55, are collars 56 which extend through suitable bearings 57 carried by the end walls 16 and 17, which bearings are accommodated by the openings 23.

Means 8 to convey a liquid, as water, to the anodic chamber 54, may be a conduit or tube 60 of dielectric, non-corrodable material, for example, rubber or glass, extending from a suitable supply source (not shown) to the anodic chamber by way of the hollow of the shaft 45, and openings 42, 46 and 49 with its outlet 61 opening into said chamber. A suitable valve 62 is interposed in the conduit 60, exteriorly of the tank 5.

Means 9 to discharge solution and gases from the fourth chamber 43 may be a conduit or tube 65, which is preferably of material similar to that of the tube 60, extending from its intake end 66 in the chamber 43, through the openings 47 and 50 and hollow shaft 45 to the exterior of the tank 5.

Means 10 to conduct electricity (direct current) to and from the apparatus may be a conductor 70 electrically connected to the cathodic structure 6 as to the wall 15, and extending to a suitable source (not shown) of direct current, and a sheathed conductor 71 in circuit with the anodic structure 7 by extending from a suitable brush structure (as the spring-urged brush 72 contacting a rotating contact 73 operatively connected with the shaft 45 exteriorly of the tank 5), thence through the hollow shaft 45 and openings 48 and 51. From the opening 48 the sheathed conductor 71 crosses the chamber 43 radially and its free end portion may be formed into a goose-neck of non-corrodible metal and electrically connected with the anode 41. From the spring-urged brush 72, a conductor 74 may extend to the source of electric energy (not shown).

Obviously any suitable means 11 may be provided to assist in rotation of the rotor portions of the apparatus. For example, a gear wheel 75 may be fixed to the shaft 45 exteriorly of the tank 5.

Means 12 to convey the clay suspension to the tank 5 for treatment may be a suitable conduit 80, terminating in a valve 81 for discharge, at the higher side wall portion 33 of the diaphragm 30 into the electrodialysis chamber 40.

A second liquid supply means 13 may be provided, as by conduit 85 and valve 86 to convey water for discharge into the cathode chamber 31 and overflowing, into the chamber 40.

In operation, water is introduced by the means 13 into the cathode chamber 31 and electrodialysis chamber 40 and the overflow, if any, will pass through the outlet 25. The chambers 31 and 40 are thus filled and the anodic structure 7 substantially half submerged. Water is next admitted by means 8 to the chambers 54 so as to just make contact between the anode 41 and anodic diaphragm 35 at the lowermost portions of both. Upon rotation of the rotor portions of the apparatus (as clockwise as in Fig. 3) at, for example, ¼ R. P. M., the desired direct current voltage is applied to the anode 41 and cathode 15 and an aqueous suspension of the impure colloidal clay to be treated is added slowly and continuously through the means 12, so it will be evenly distributed in the effective electrodialysis area of the electrodialysis chamber 40.

The colloidal clay particles are negatively charged and hold cations such as sodium, potassium, and calcium electrostatically on their surfaces. Within the electrodialysis chamber 40, the negatively charged clay particles migrate cataphoretically towards the anode chamber and the cations move electrolytically through the cathode diaphragm 30 to the cathode where they form the appropriate hydroxides, and hydrogen gas is evolved. The negatively charged clay particles adhere to the positively charged diaphragm 35 of the anodic chamber where they are converted to the acid clay by the hydrogen ions moving from the anode 41 to the cathode 15 by electrolysis. Any soluble anions, which are present in the clay as impurities, pass through the anode diaphragm 35 and are decomposed into gases at the anode 41. The water in the anodic chamber moves electro-osmotically through the diaphragms towards the cathode 15 thus requiring that water be constantly added to the anode chamber to maintain it at the desired level. This level of the water in the anodic chamber should be kept as low as possible to prevent the acid clay, which has been deposited on the anodic diaphragm 35 from being flushed off by the water moving through this diaphragm towards the cathode. As the anodic chamber revolves the acid clay is deposited on the anode diaphragm 35 in an evenly distributed layer and may be removed by an appropriate scraping device (not shown) at a point just above that at which the fresh colloidal clay suspension is added to the electrodialysis chamber.

If a metallic salt of the clay is desired (viz., Cu-clay) the water of the anode chamber is replaced by an aqueous solution of the appropriate inorganic salt of the metal (i. e., CuSO₄). The cations furnished by the salt solution within the anode chamber migrate electrolytically through the anode diaphragm towards the cathode and, at the outer surface of this diaphragm, combine with the negatively charged clay particles being deposited cataphoretically, or may replace the hydrogen from any acid clay deposited. The completeness of the conversion of the acid clay to the clay salt of the desired metal depends upon the speed of rotation of the rotor portions of the apparatus, the rate of addition of the impure clay to the electrodialysis chamber, and the concentration of the salt in the anode chamber. Thus, one may produce a metal-acid clay salt having any desired percentage of its adsorbed hydrogen replaced by a desired metallic cation (the limits are from pure acid clay to pure metallic clay).

The metal salts of clay and the metal-acid clay salts may be produced by substituting an appropriate metal anode (viz., copper) for an inert graphite or platinum anode. In this modification, the metal anode dissolves as a result of the electrolytic oxidation reactions at the anode and the cations thus produced react in the same manner as do the cations from the solution employed with the inert anode.

Thus, it will be observed, that the new apparatus combines in one compact unit means to effectively and substantially completely remove adsorbed cations and molecular impurities from suspended colloidal clays by electrodialysis, to produce a colloidal clay acid, and, by cataphoresis, to concentrate and precipitate the colloidal acid and, finally, by electrolysis, to convert the precipitated clay acid into a substantially pure metallic salt of the clay.

Various changes may be made to the form of the invention herein shown and described without departing from the spirit of the invention or scope of the claims.

What is claimed is:

1. In apparatus for the production of substantially pure colloidal clay salts and clay acids, a tank having end walls and an outer arcuate side wall providing a cathode; a cathodic diaphragm spaced inwardly therefrom with the space therebetween providing a cathode chamber, said cathodic diaphragm being substantially cylindrical and with its ends carried by said end walls; a substantially cylindrical anodic diaphragm spaced inwardly of the cathodic diaphragm, with the space therebetween providing an electrodialysis chamber, said anodic diaphragm having a pair of end walls; a hollow anode spaced from the anodic diaphragm, and carried by said second-named end walls, with the space therebetween providing an anode chamber, and the hollow within said anode providing a fourth chamber; means rotatably supporting said anodic diaphragm and anode from said first-named end walls; means to discharge fluid from the fourth chamber to exteriorly of said apparatus; means to convey an electrolyte to contact said anode and anodic diaphragm; an electric conductor electrically connected with said anode; an electric conductor electrically connected with said cathode; means to conduct said electrolyte to said fourth chamber; and means to conduct a colloidal clay suspension to said electrodialysis chamber.

2. In apparatus for the production of substantially pure colloidal clay salts and clay acids, a tank having end walls, and an outer arcuate side wall providing a cathode; a cathodic diaphragm spaced inwardly therefrom with the space therebetween providing a cathode chamber, said cathodic diaphragm being substantially cylindrical and with its ends carried by said end walls; a substantially cylindrical anodic diaphragm spaced inwardly of the cathodic diaphragm, with the space therebetween providing an electrodialysis chamber, said anodic diaphragm having a pair of end walls rotatably supported by said first-named end walls; a substantially cylindrical anode spaced inwardly of the anodic diaphragm, with the space therebetween providing an anodic chamber, and the space within said cylindrical anode providing a fourth chamber, the end portions of said anode being carried by said second-named end walls; means rotatably supporting said anodic diaphragm and anode; means to convey an electrolyte to contact said anode and anodic diaphragm; an electric conductor in electrical contact with said anode; means to discharge fluid from the fourth chamber to exteriorly of said apparatus; an electric conductor electrically connected with said cathode; means to conduct said electrolyte to said fourth chamber; and means to conduct a colloidal clay suspension to said electrodialysis chamber.

3. In apparatus for the production of substantially pure colloidal clay salts and clay acids, a tank having end walls, and an outer arcuate side wall providing a cathode; a cathodic diaphragm spaced inwardly therefrom with the space therebetween providing a cathode chamber, said cathodic diaphragm being substantially cylindrical and with its ends carried by said end walls; a substantially cylindrical anodic diaphragm spaced inwardly of the cathodic diaphragm, with the space therebetween providing an electrodialysis chamber, said anodic diaphragm having a pair of end walls rotatably supported by said first-named end walls; a substantially cylindrical anode spaced inwardly of the anodic diaphragm, with the space therebetween providing an anodic chamber, and the space within said cylindrical anode providing a fourth chamber, the end portions of said anode being carried by said second-named end walls; means rotatably supporting said anodic diaphragm and anode, including a hollow shaft extending through all of said end walls and into the space within said anode; means to discharge fluid from the fourth chamber to exteriorly of said apparatus; means to convey an electrolyte through said shaft to contact said anode and anodic diaphragm; an electric conductor extending into said shaft, with a terminal thereof in electrical contact with said anode; an electric conductor electrically connected with said cathode; means to conduct said electrolyte to said fourth chamber from said anodic chamber; and means to conduct a colloidal clay suspension to said electrodialysis chamber.

4. In apparatus for the production of substantially pure colloidal clay salts and clay acids, a tank having end walls and a side wall provided with substantially horizontal upper edges; said end and side wall defining an upwardly-opening compartment and said side wall providing a cathode; a cathodic diaphragm spaced inwardly of said side wall and having substantially horizontal upper edges below the horizontal planes of said first-named edges, one of said second-named edges being above the horizontal plane of the other of said second-named edges, the space between said side wall and said diaphragm providing a cathode chamber; a substantially cylindrical anodic diaphragm spaced inwardly of said cathodic diaphragm, with the space therebetween providing an electrodialysis chamber; end walls closing the ends of said anodic diaphragm; a cylindrical anode within and spaced from said anodic diaphragm having a fourth chamber consisting of the space within said cylindrical anode, said anode being carried by said last-named end walls; means to discharge fluid from said fourth chamber to exteriorly of said apparatus; means to convey an electrolyte to contact said anode and anodic diaphragm; means to conduct an electric current to said electrolyte, including a terminal carried by said anode; a conductor electrically connected with said cathode; means to conduct said electrolyte to said fourth chamber; means to conduct a colloidal clay suspension to said electrodialysis chamber, including a conduit with its outlet adjacent said higher of said two second-named edges of said cathodic diaphragm; and means to rotatably support said anodic diaphragm and anode from said first-named end walls.

5. In apparatus for the production of substantially pure colloidal clay salts and clay acids, a tank having end walls, and an outer arcuate side wall providing a cathode; a cathodic diaphragm spaced inwardly therefrom with the space therebetween providing a cathode chamber, said cathodic diaphragm being substantially cylindrical and with its ends carried by said end walls; a substantially cylindrical anodic diaphragm spaced inwardly of the cathodic diaphragm, with the space therebetween providing an electrodialysis chamber, said anodic diaphragm having a pair of end walls supported by said first-named end walls; a substantially cylindrical anode spaced inwardly of the anodic diaphragm, with the space therebetween providing an anodic chamber, and the space within said cylindrical anode providing a fourth chamber, the end portions of said anode being carried by said second-named end walls; means rotatably supporting said anodic diaphragm and anode, including a hollow shaft extending through all of said end walls and into the space within said anode; means to discharge fluid from the fourth chamber to exteriorly of said apparatus, comprising a conduit extending through said hollow shaft; means to convey an electrolyte through said shaft to contact said anode and anodic diaphragm; an electric conductor extending into said shaft, with a terminal thereof in electrical contact with said anode; an electric conductor electrically connected with said cathode; means to conduct said electrolyte to said fourth chamber from said anodic chamber; and means to conduct a colloidal clay suspension to said electrodialysis chamber.

DALE H. SIELING.

REFERENCES CITED

The following references are of record in the file of this patent:

UNITED STATES PATENTS

| Number | Name | Date |
|---|---|---|
| 993,888 | Schwerin | May 30, 1911 |
| 1,133,967 | Illig et al. | Mar. 30, 1915 |
| 1,174,946 | Illig | Mar. 7, 1916 |
| 1,326,106 | Schwerin | Dec. 23, 1919 |
| 2,099,328 | Casagrande | Nov. 16, 1937 |
| 2,236,861 | Widell | Apr. 1, 1941 |
| 2,295,476 | Ibison | Sept. 8, 1942 |